US012640064B2

(12) United States Patent
Won et al.

(10) Patent No.: US 12,640,064 B2
(45) Date of Patent: May 26, 2026

(54) DISPLAY DEVICE AND ELECTRONIC DEVICE HAVING THE SAME

(71) Applicant: SAMSUNG DISPLAY CO., LTD., Yongin-si (KR)

(72) Inventors: Byeong-Hee Won, Yongin-si (KR); Beomshik Kim, Yongin-si (KR); Youngchan Kim, Yongin-si (KR); Subin Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/810,775

(22) Filed: Aug. 21, 2024

(65) Prior Publication Data
US 2025/0069531 A1 Feb. 27, 2025

(30) Foreign Application Priority Data
Aug. 22, 2023 (KR) ........................ 10-2023-0109889

(51) Int. Cl.
G09G 3/00 (2006.01)
G02B 30/28 (2020.01)
G09G 3/20 (2006.01)

(52) U.S. Cl.
CPC ............. G09G 3/003 (2013.01); G02B 30/28 (2020.01); G09G 3/2007 (2013.01); G09G 2320/0238 (2013.01); G09G 2320/0276 (2013.01); G09G 2320/0673 (2013.01)

(58) Field of Classification Search
CPC ............... G09G 3/3233; G09G 3/3258; G09G 2300/0426; G09G 2300/0819; G09G 2320/0214; G09G 2300/0842; G09G 2300/0861; H10D 86/441; H10D 86/60;
(Continued)

(56) References Cited

U.S. PATENT DOCUMENTS 9,794,548 B2 10/2017 Yoon et al.
2006/0284895 A1* 12/2006 Marcu ...................... G09G 3/20
345/690
(Continued)

FOREIGN PATENT DOCUMENTS

CN 101312502 A * 11/2008 ........... H04N 23/634
KR 10-2104333 4/2020

*Primary Examiner* — Shaheda A Abdin
(74) *Attorney, Agent, or Firm* — F. CHAU & ASSOCIATES, LLC

(57) ABSTRACT

Disclosed is a display device. A display panel outputs a first image in a first mode and outputs a second image in a second mode. A switch lens array is placed on the display panel and outputs the first image as a two-dimensional (2D) image in the first mode and converts the second image into a three-dimensional (3D) image in the second mode. A driving controller receives an image signal, converts the image signal into 2D image data based on a reference gamma value, and converts the image signal into 3D image data based on a correction reference gamma value different from the reference gamma value. A driving controller includes a gamma selection unit that selects one correction gamma value among a plurality of correction gamma values as the correction reference gamma value depending on predetermined depth information of the 3D image.

20 Claims, 14 Drawing Sheets

(58) Field of Classification Search
    CPC .. H10D 86/481; H10D 86/423; H10K 59/131;
                                           H10K 59/1216
    See application file for complete search history.

(56)                        References Cited

U.S. PATENT DOCUMENTS

| 2012/0147205 | A1* | 6/2012 | Lelescu | H04N 23/62 |
| | | | | 348/E5.024 |
| 2014/0063208 | A1* | 3/2014 | Fukasawa | A61B 8/466 |
| | | | | 348/51 |
| 2014/0354706 | A1* | 12/2014 | Yoon | H04N 13/341 |
| | | | | 345/690 |
| 2017/0162094 | A1* | 6/2017 | Jee | G09G 3/006 |

* cited by examiner

FIG. 6

DISPLAY DEVICE AND ELECTRONIC DEVICE HAVING THE SAME

CROSS-REFERENCE TO RELATED APPLICATIONS

This application claims priority under 35 U.S.C. § 119 to Korean Patent Application No. 10-2023-0109889 filed on Aug. 22, 2023, in the Korean Intellectual Property Office, the disclosure of which is incorporated by reference herein in its entirety.

BACKGROUND

Embodiments of the present disclosure described herein relate to a display device and an electronic device having the same, and more particularly, relate to a display device capable of displaying a three-dimensional (3D) image and an electronic device having the same.

A 3D display technology is being used in a variety of image display applications, such as movies, television, and mobile phones. Three-dimensional displays may be used to create the same sense of three-dimensionality that people experience in the real world. To this end, many types of technologies, such as stereo and multi-view methods, are being researched. Among the technologies, a light field method may more accurately generate 3D spatial information.

Light generated from a display panel may form a light field after passing through a lens. Methods of forming a light field include a method of controlling the direction of light by using a diffraction grating, a method of controlling the direction of light by using a pinhole or barrier, and a method of controlling the direction of refraction of light by using an array of lenses.

SUMMARY

Embodiments of the present disclosure provide a display device that improves the image quality of a 3D image, and an electronic device having the same.

According to an embodiment, a display device includes a display panel including a plurality of pixels, wherein the display panel is configured to output a first image in a first mode and output a second image in a second mode, a switch lens array on the display panel, wherein the switch lens array is configured to output the first image as a two-dimensional (2D) image in the first mode and convert the second image into a three-dimensional (3D) image in the second mode, and a driving controller that converts an image signal into 2D image data based on a reference gamma value, and converts the image signal into 3D image data based on a correction reference gamma value different from the reference gamma value.

The driving controller includes a gamma selection unit that selects one correction gamma value from among a plurality of correction gamma values, as the correction reference gamma value, based on predetermined depth information of the 3D image.

According to an embodiment, an electronic device includes a display panel including a plurality of pixels, wherein the display panel is configured to output a first image in a first mode and output a second image in a second mode, a switch lens array on the display panel, wherein the switch lens array is configured to output the first image as a 2D image in the first mode and converting the second image into a 3D image in the second mode, a driving controller configured to receive an image signal, convert the image signal into 2D image data based on a reference gamma value, and convert the image signal into 3D image data based on a correction reference gamma value different from the reference gamma value, and a main processor that provides the image signal to the driving controller.

The driving controller includes a gamma selection unit that selects one correction gamma value from among a plurality of correction gamma values, as the correction reference gamma value, based on predetermined depth information of the 3D image.

According to an embodiment, a display device includes a display panel including a plurality of pixels, wherein the display panel is configured to output a first image in a first mode and output a second image in a second mode, a switch lens array on the display panel, wherein the switch lens array is configured to output the first image as a two-dimensional (2D) image in the first mode and convert the second image into a three-dimensional (3D) image in the second mode, wherein the switch lens array is turned off in the first mode, and is turned on in the second mode to form a plurality of lenses, and a driving controller that converts an image signal into 2D image data based on a reference gamma value, and converts the image signal into 3D image data based on a correction reference gamma value different from the reference gamma value.

BRIEF DESCRIPTION OF THE FIGURES

The above and other aspects and features of the present disclosure will become apparent by describing in detail embodiments thereof with reference to the accompanying drawings.

FIG. 6 is a block diagram of an electronic device, according to an embodiment of the present disclosure.

DETAILED DESCRIPTION

Figure 1:
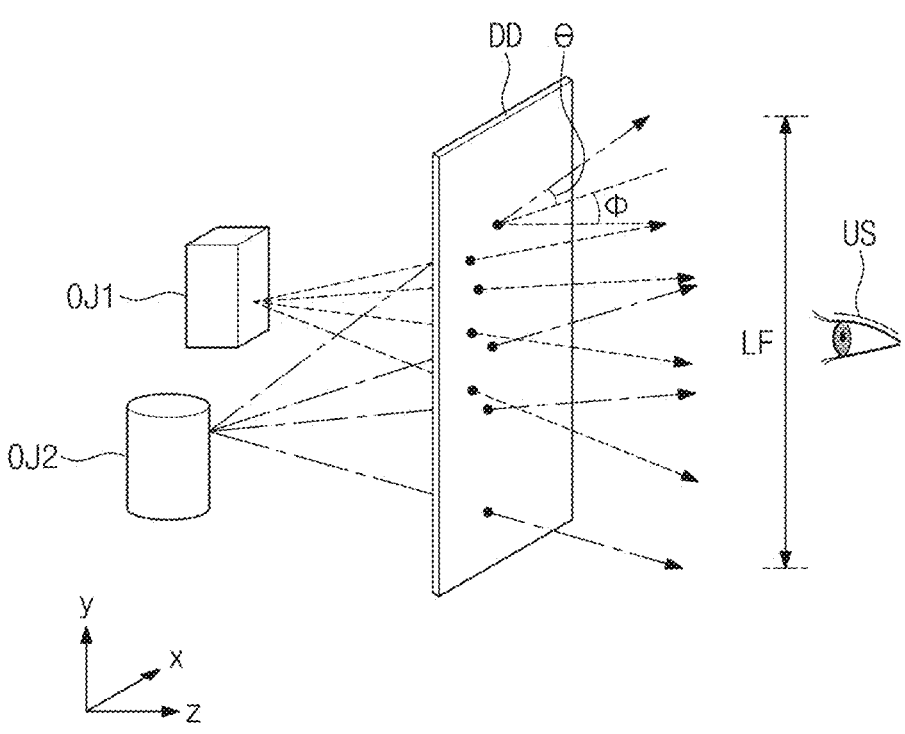
FIG. 1 is a diagram illustrating that a user views a 3D image through a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components throughout the drawings and specification. In the drawings, the thickness, size ratio, and dimensions of components are exaggerated for effectiveness of description of technical contents. The term "and/or" refers to combinations of recited elements, for example, A, B, and/or C, including, A alone, B alone, C alone, A and B, A and C, B and C, and A and B and C.

Although the terms "first", "second", etc. may be used to describe various components, the components should not be construed as being limited by the terms. The terms are used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, but not precluding the presence or additional possibility of one or more other features, numbers, steps, operations, elements, or components or a combination thereof.

Unless otherwise defined, terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a diagram illustrating that a user views a 3D image through a display device, according to an embodiment of the present disclosure.

Referring to FIG. 1, a display device DD may display a 3D image utilizing a 'light field' method. The display device DD may generate a 3D image by generating a light field LF represented by a vector distribution of light in space, where the relevant portion of the light field LF can be between the display device DD and a user US. When a user US views the display device DD within the light field LF, the user US may experience the sense of three-dimensionality. The light field LF may be a five-dimensional (5D) plenoptic function $I(x, y, z, \theta, \varphi)$ representing the direction and intensity of light at any point in 3D space. In other words, the 5D plenoptic function of the light field LF may be expressed by 3D spatial coordinates $(x, y, z)$ of a point in the 3D space, where a ray passes, and luminance with respect to a spatial direction angle $(\theta, \varphi)$ where the ray is directed. The light field LF may be captured by informationizing a value of the plenoptic function of light as the light travels through 3D space.

In various embodiments, the light output from the display device DD may form the light field LF facing in a specific direction (e.g., a viewpoint) of an observer (e.g., a user US). The user US within the light field LF may perceive objects OJ1 and OJ2 as a 3D image, where the perceived objects OJ1 and OJ2 may be virtual objects.

Figure 2:
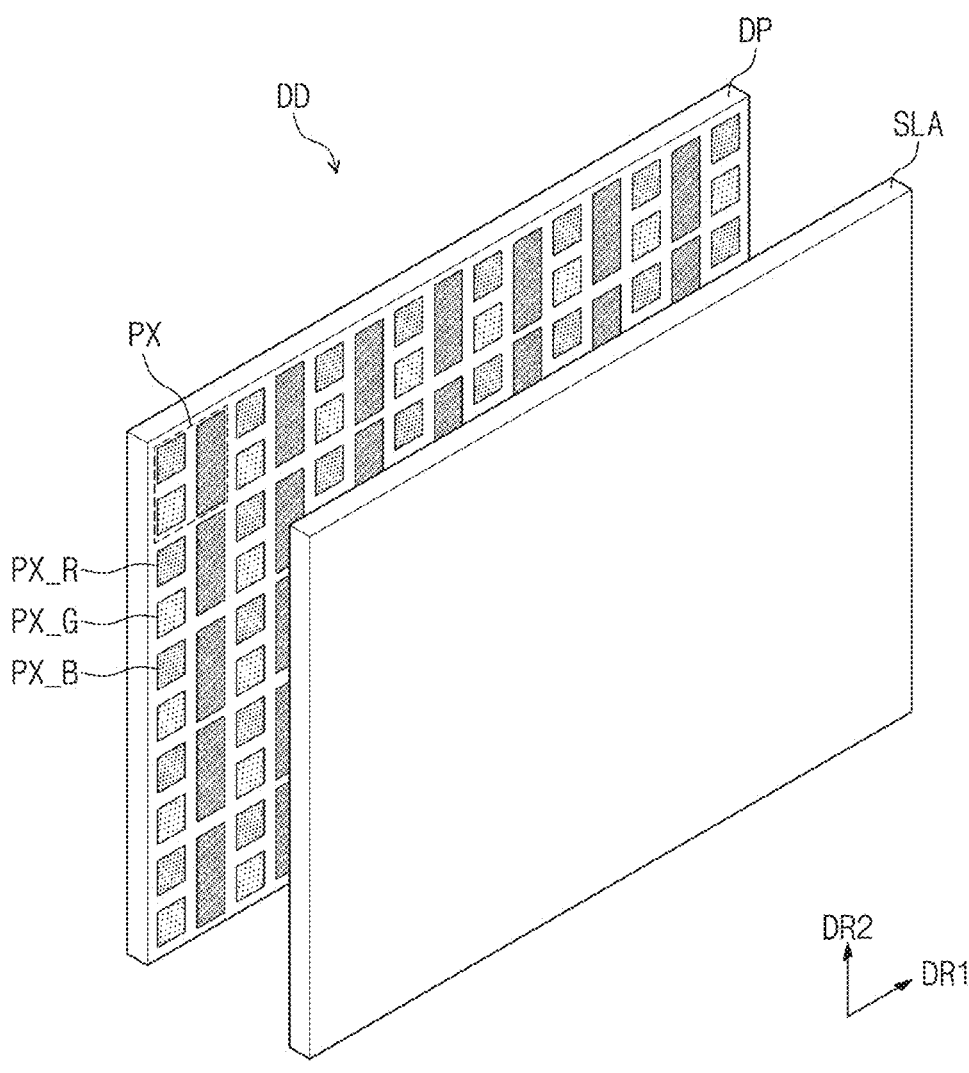
FIG. 2 is an exploded perspective view illustrating a display device, according to an embodiment of the present disclosure.

FIG. 2 is an exploded perspective view illustrating a display device, according to an embodiment of the present disclosure.

Figure 3:
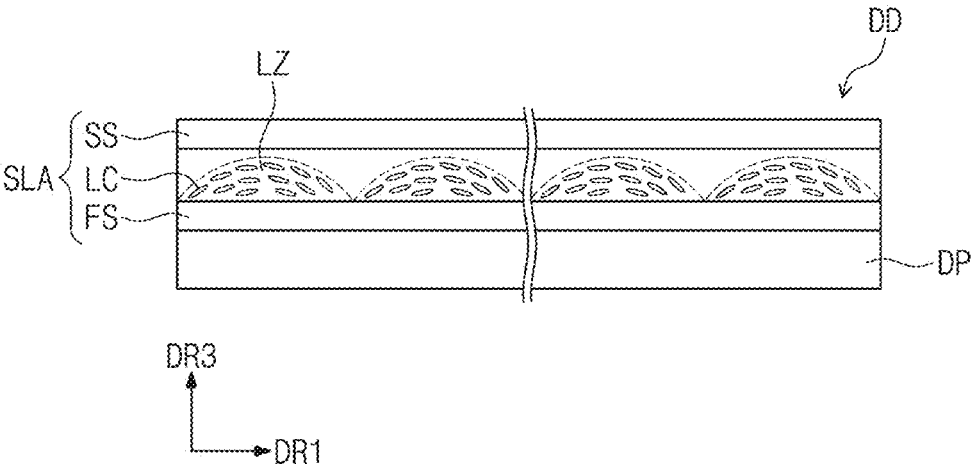
FIG. 3 is a cross-sectional view of a display device, according to an embodiment of the present disclosure.

FIG. 3 is a cross-sectional view of a display device, according to an embodiment of the present disclosure.

Referring to FIG. 2, the display device DD may include a display panel DP and a switch lens array SLA. In an embodiment, the display device DD may be a light field display device. The display device DD may be used in electronic devices such as smartphones, smart watches, tablet PCs, notebook computers, computers, smart televisions, and navigation systems.

In various embodiments, the display panel DP may be a light emitting display panel, where for example, the display panel DP may be an organic light emitting display panel, an inorganic light emitting display panel, or a quantum dot light emitting display panel, but is not limited thereto. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like.

In various embodiments, the display panel DP may include a plurality of pixels PX. Each of the plurality of pixels PX may include a first type pixel PX_R, a second type pixel PX_G, and a third type pixel PX_B. The first type pixel PX_R may be a pixel that outputs light of a first color (e.g., red light); the second type pixel PX_G may be a pixel that outputs light of a second color (e.g., green light); and, the third type pixel PX_B may be a pixel that outputs light of a third color (e.g., blue light). FIG. 2 shows that each pixel PX may include three type pixels, PX_R, PX_G, and PX_B, but the present disclosure is not limited thereto. For example, each pixel PX may include four type pixels (e.g., a first type pixel to a fourth type pixel). In this case, the first type pixel may be a pixel that outputs the red light (or the first light), the second and fourth type pixels may be pixels that output the green light (or the second light), and the third type pixel may be a pixel that outputs the blue light (or the third light).

In various embodiments, the pixels PX may be arranged in a matrix formed in a first direction DR1 and a second direction DR2 substantially perpendicular to the first direction DR1. The first direction DR1 and the second direction DR2 shown in FIG. 2 may correspond to the x-axis and the y-axis of the spatial coordinates shown in FIG. 1, respectively.

In various embodiments, the display panel DP outputs a first image in a first mode (e.g., a 2-dimensional (2D) mode), and outputs a second image in a second mode (e.g., a 3D mode).

In various embodiments, the switch lens array SLA is placed on a first surface (or a top surface) of the display panel DP, where the first surface of the display panel DP may be a surface from which light is emitted. The switch lens array SLA and the display panel DP may be configured to have the light emitted by the pixels PX pass through the switch lens array SLA. The switch lens array SLA may be turned off in the first mode to output the first image as a two-dimensional (2D) image, and the switch lens array SLA may be turned on in the second mode to convert the second image to a three-dimensional (3D) image. The switch lens array SLA may be on the display panel DP and configured to output the first image as the 2D image in the first mode and to convert the second image into the 3D image in the second mode.

Referring to FIG. 3, the switch lens array SLA may include a first substrate FS, a liquid crystal layer LC, and a second substrate SS. The first and second substrates FS and SS are disposed to face each other, and the liquid crystal layer LC is interposed between the first and second substrates FS and SS. In the first mode, no electric field is formed between the first and second substrates FS and SS, and thus liquid crystal molecules included in the liquid crystal layer LC are not arranged (e.g., aligned with an electric field). However, in the second mode, an electric field is formed between the first and second substrates FS and SS, and thus the liquid crystal molecules included in the liquid crystal layer LC may be arranged (e.g., aligned) by the electric field. In the switch lens array SLA, a plurality of lenses LZ may be formed by the arrangement of liquid crystal molecules. Light output from the display panel DP may pass through the lenses LZ of the switch lens array SLA to form the light field LF (refer to FIG. 1).

In various embodiments, each of the plurality of lenses LZ may be an active lens that is activated by an electric field, where the size and shape of each of the lenses LZ may be controlled based on levels of voltages applied to electrodes respectively provided on the first and second substrates FS and SS. The profile of the shape of each of the lenses LZ may depend on the voltages applied to the electrodes.

In various embodiments, the arrangement of the pixels PX of the display panel DP for forming a light field, the arrangement of the lenses LZ constituting the switch lens array SLA, and the relative location relationship between the pixels PX and lenses LZ may be varied.

Figure 4:
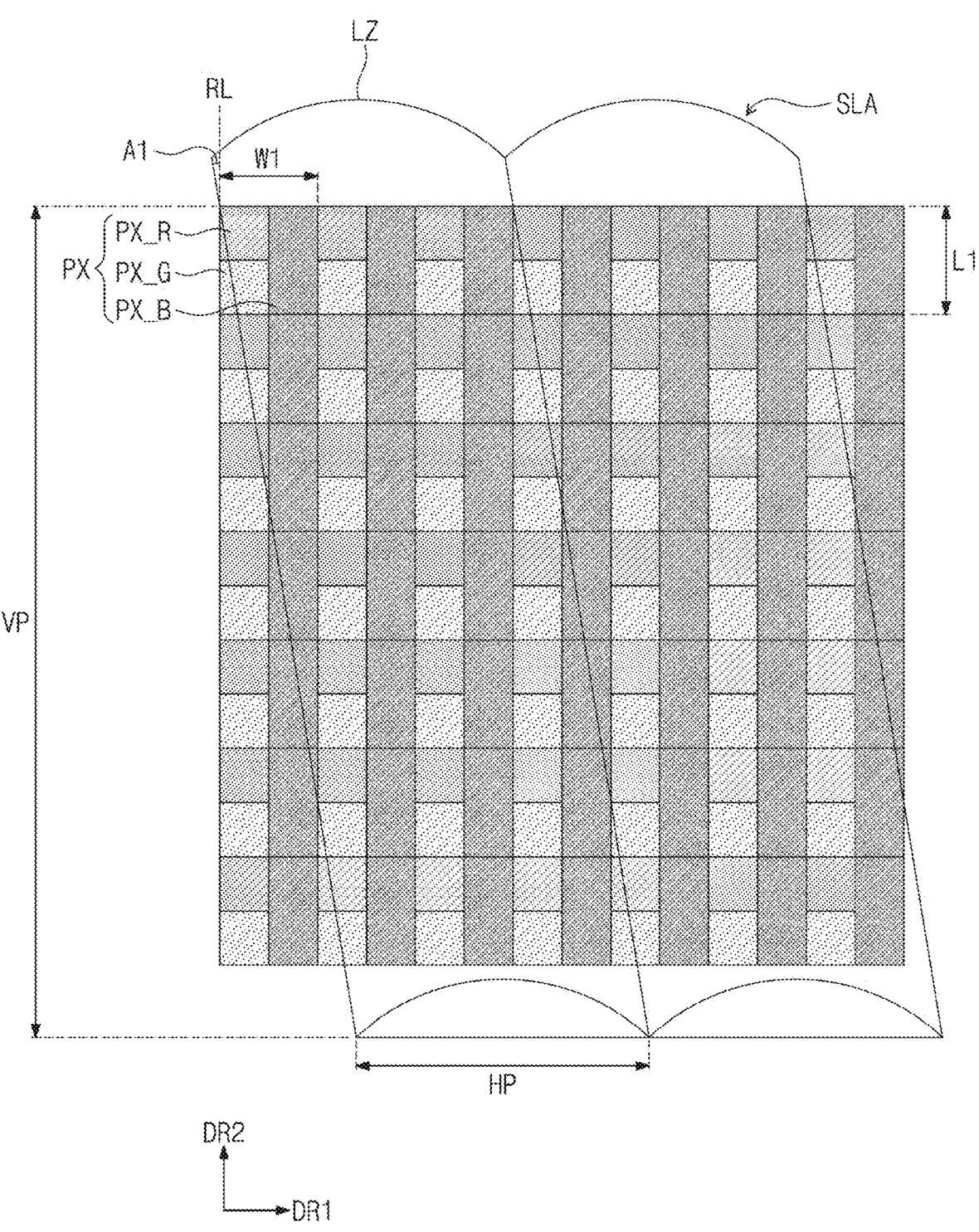
FIG. 4 is a drawing illustrating that a pixel array and a switch lens array are positioned while overlapping each other, according to an embodiment of the present disclosure.

FIG. 4 is a drawing illustrating that a pixel array and a switch lens array are positioned, while overlapping each other, according to an embodiment of the present disclosure.

Figure 5:
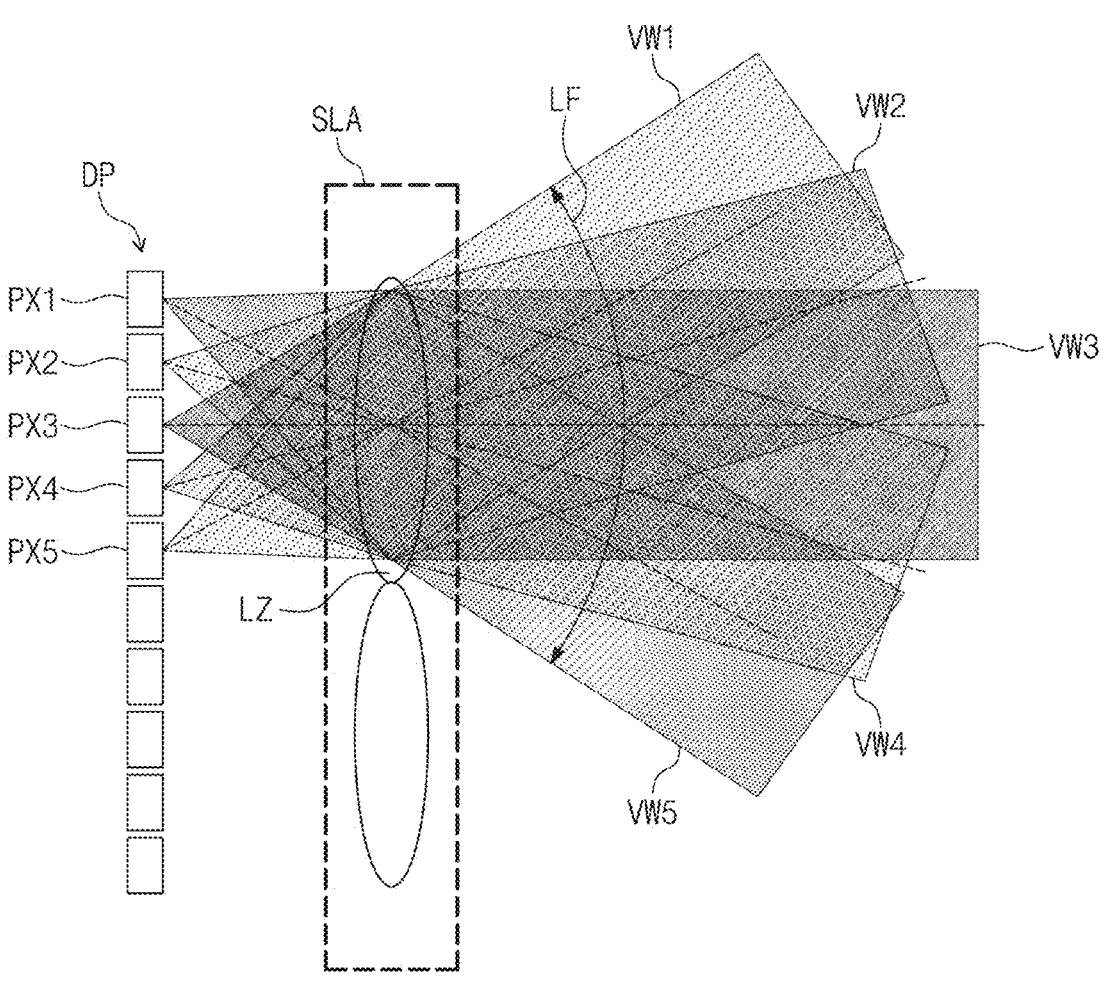
FIG. 5 is a diagram for describing a 3D image display process of a display device, according to an embodiment of the present disclosure.

FIG. 5 is a diagram for describing a 3D image display process of a display device, according to an embodiment of the present disclosure.

Referring to FIGS. 4 and 5, the display panel DP includes a plurality of pixels PX. The switch lens array SLA includes one or more lenses LZ. The one lens LZ may correspond to 'k' pixels out of the plurality of pixels PX, where a single lens LZ may overlap a plurality of pixels PX. Some of 'k' pixels output a left-eye image, and other pixels, thereof, output a right-eye image. Each of the plurality of lenses LZ can correspond to 'k' pixels among the plurality of pixels PX, the 'k' being a natural number greater than 1. Some of the 'k' pixels may output a left-eye image, and the others of the 'k' pixels may output a right-eye image.

As shown in FIG. 5, the lens LZ corresponds to five pixels (hereinafter, first to fifth pixels PX1, PX2, PX3, PX4, and PX5) in the second direction DR2. Furthermore, the first to fifth pixels PX1, PX2, PX3, PX4, and PX5 may output first to fifth viewpoint images having different viewpoints from one another. Light output from the first to fifth pixels PX1, PX2, PX3, PX4, and PX5 may be diffracted and/or refracted through each lens LZ to form different light fields from one another, thereby displaying a 3D image with first to fifth viewpoints VW1 to VW5.

In various embodiments, each of the lenses LZ in the switch lens array SLA may overlap the three pixels PX in the first direction DR1, as shown in FIG. 4. Because the one lens LZ corresponds to three the pixels PX in the first direction DR1, a first pitch HP of each lens LZ in the first direction DR1 may correspond to approximately three times the width W1 of each pixel PX in the first direction DR1. Each of the lenses LZ may have a second pitch VP in the second direction DR2. The second pitch VP may be greater than the first pitch HP.

In an example of the present disclosure, each of the lenses LZ may have a shape inclined at a first inclination angle μl with respect to a reference line RL parallel to the second direction DR2. The first inclination angle μl may vary depending on the width W1 of each of the pixels PX1 to PX5 in the first direction DR1 or a length LI of each of the pixels PX1 to PX5 in the second direction DR2.

In various embodiments, each of the first to fifth pixels PX1 to PX5 may include the first to third type pixels PX_R, PX_G, and PX_B. In an example, the display panel DP may output one or more viewpoint images. Each of the viewpoint images may include a left-eye image and a right-eye image. Each viewpoint image may include a left-eye image provided to a user's left-eye and a right-eye image provided to the user's right-eye.

In various embodiments, the number of pixels PX1 to PX5 corresponding to each lens LZ and the size and arrangement order of each of the pixels PX1 to PX5 may be variously changed.

Figure 6:
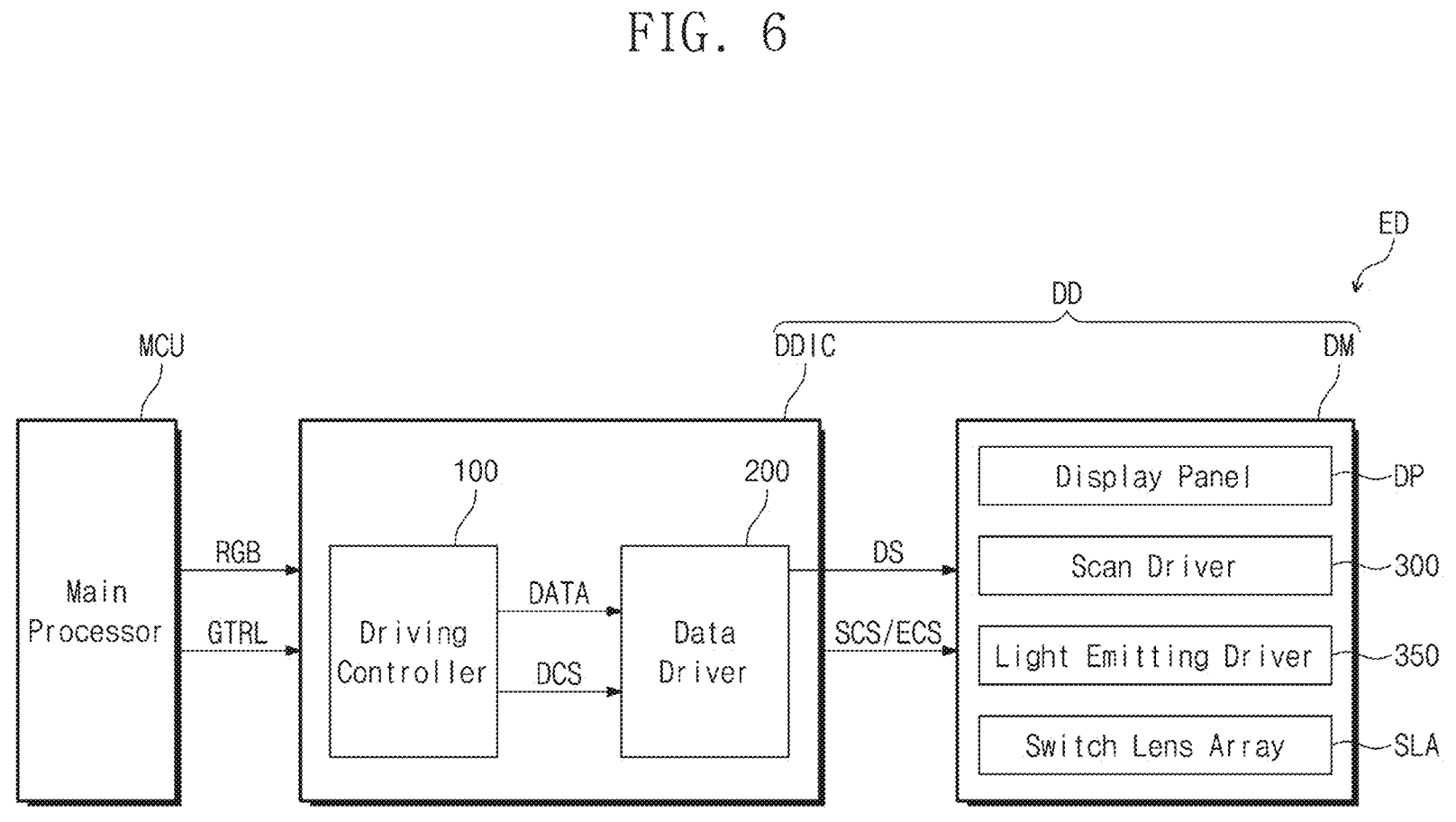

FIG. 6 is a block diagram of an electronic device, according to an embodiment of the present disclosure.

Figure 7:
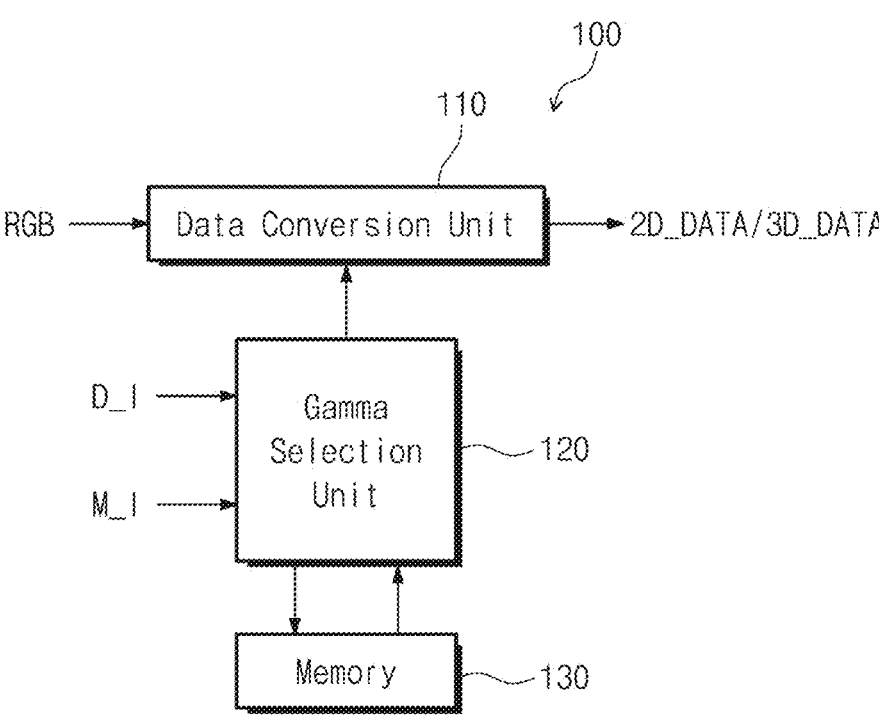
FIG. 7 is a block diagram of the driving controller shown in FIG. 6.

FIG. 7 is a block diagram of the driving controller shown in FIG. 6.

Referring to FIG. 6, the electronic device ED may be a device that outputs various pieces of information through the display device DD. The electronic device ED may be an electronic device such as smartphones, smart watches, tablet PCs, notebook computers, computers, smart televisions, and navigation systems.

In various embodiments, the electronic device ED may communicate with an external electronic device over a network (e.g., a short-range wireless communication network or long-range wireless communication network). According to an embodiment, the electronic device ED may include a main processor MCU and the display device DD.

In various embodiments, the main processor MCU may control overall operations of the electronic device ED, where the electronic device ED may include an operating system. The main processor MCU may include one or more of a central processing unit (CPU) or an application processor (AP). The main processor MCU may further include one or more of a graphics processing unit (GPU), a communication processor (CP), and an image signal processor (ISP).

In various embodiments, the display device DD may include a display driver integrated circuit DDIC and a display module DM. The display driver integrated circuit DDIC (or a display driver chip) may include a driving controller 100 (or a driving control circuit) and a data driver 200 (a data driver circuit). The driving controller 100 can receive an image signal RGB and a control signal CTRL from the main processor MCU. The driving controller 100 can output image data DATA obtained by converting a data format of the image signal RGB in compliance with the specification for an interface with the data driver 200. The driving controller 100 may output various driving control signals (e.g., first to third driving control signals DCS, SCS, and ECS) utilized for driving the display module DM based on the control signal CTRL.

In various embodiments, the data driver 200 receives the image data DATA and the first driving control signal DCS from the driving controller 100. The data driver 200 may compensate for the image data DATA, such that an image is displayed at the desired luminance based on characteristics of the electronic device ED, settings of the user, or the like, or may convert the image data DATA to reduce power consumption, compensate for afterimages, or the like.

In various embodiments, the display driver integrated circuit DDIC may include a voltage generator, etc., where the voltage generator may output various voltages utilized to operate the display panel DP.

In various embodiments, the display module DM provides visual information to the user. The display module DM may include the display panel DP, a scan driver 300 (e.g., a scan driving circuit), a light emitting driver 350 (e.g., a light emitting driving circuit), and the switch lens array SLA.

In various embodiments, the display panel DP may include the plurality of type pixels PX_R, PX_G, and PX_B (see e.g., FIG. 2), a plurality of scan lines, a plurality of data lines, a plurality of light emission control lines, and voltage lines. Each of the type pixels PX_R, PX_G, and PX_B may include a light emitting element and a pixel driving circuit connected to the light emitting element. The pixel driving circuit may be electrically connected to a corresponding scan line among a plurality of scan lines, a corresponding data line among a plurality of data lines, and a corresponding emission control line among a plurality of emission control lines, and voltage lines.

In various embodiments, the scan driver 300 may be configured to receive the second driving control signal SCS from the display driver integrated circuit DDIC, where the second driving control signal SCS may be from the driving controller 100. The scan driver 300 may output scan signals to scan lines in response to the second driving control signal SCS.

In various embodiments, the light emitting driver 350 may be configured to receive the third driving control signal ECS from the display driver integrated circuit DDIC, where the third driving control signal ECS may be from the driving controller 100. The light emitting driver 350 may output emission control signals through emission control lines in response to the third driving control signal ECS. In various embodiments, the scan driver 300 may be connected to the emission control lines, where the light emitting driver 350 may be omitted, and the scan driver 300 may output the emission control signals to the emission control lines.

In various embodiments, the scan driver 300 and the light emitting driver 350 may be embedded in a display panel DP, where the scan driver 300 and the light emitting driver 350 may be included in the display panel DP through a process of forming a pixel driving circuit.

In various embodiments, the switch lens array SLA may be disposed on the display panel DP to operate in a first mode or a second mode under control of the driving controller 100.

Referring to FIGS. 6 and 7, the driving controller 100 may allow the display device DD to display images in the first mode or the second mode. The driving controller 100 may include a data conversion unit 110, a gamma selection unit 120, and a memory 130, as shown in FIG. 7.

In various embodiments, the data conversion unit 110 may receive the image signal RGB from the main processor MCU. The data conversion unit 110 can be configured to convert the image signal RGB into 2D image data 2D_DATA (or first image data) in the first mode, and convert the image signal RGB into 3D image data 3D_DATA (or second image data) in the second mode.

In various embodiments, the gamma selection unit 120 may receive mode information M_I or depth information D_I about a 3D image from the main processor MCU. The mode information M_I may include information about a mode in which the display device DD operates. In response to the display device DD operating in the first mode, information about the first mode may be provided to the gamma selection unit 120. In response to the display device DD operating in the second mode, information about the second mode may be provided to the gamma selection unit 120.

In various embodiments, the gamma selection unit 120 may determine a gamma value to be provided to the data conversion unit 110 based on the mode information M_I. The gamma selection unit 120 may provide reference gamma data corresponding to a reference gamma value, such that the data conversion unit 110 is capable of converting the image signal RGB into the 2D image data 2D_DATA based on the reference gamma value in the first mode. Moreover, the gamma selection unit 120 may provide correction gamma data corresponding to a correction reference gamma value, such that the data conversion unit 110 is capable of converting the image signal RGB into the 3D image data 3D_DATA based on a correction reference gamma value, which may be different from the reference gamma value, in the second mode. The correction reference gamma value may be based on the predetermined depth information of the 3D image.

In various embodiments, the gamma selection unit 120 may select one correction gamma value from a plurality of correction gamma values, as the correction reference gamma value depending on the depth information D_I set in advance for the 3D image.

In various embodiments, the memory 130 may include a plurality of correction gamma tables corresponding to the plurality of correction gamma values, respectively. Values for the correction gamma data for each grayscale set, depending on the corresponding correction gamma value, may be stored in each correction gamma table. The gamma selection unit 120 may select a correction gamma value depending on the depth information D_I with reference to the correction gamma table.

Figure 8A:
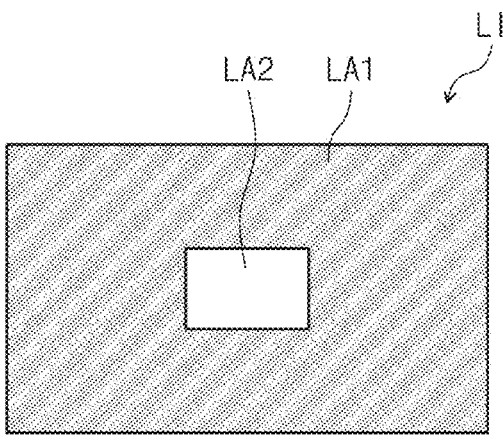
FIG. 8A is a diagram illustrating a target left-eye input image, according to an embodiment of the present disclosure.
Figure 8B:
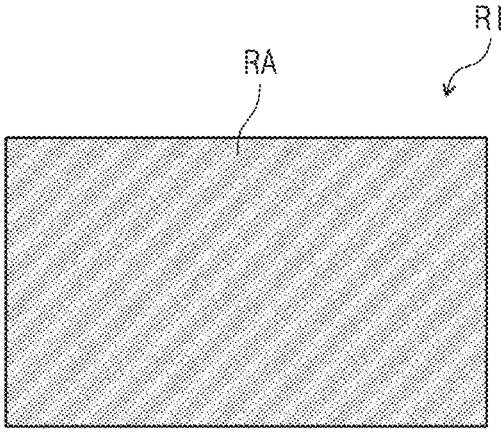
FIG. 8B is a diagram illustrating a target right-eye input image, according to an embodiment of the present disclosure.

FIG. 8A is a diagram illustrating a target left-eye image, according to an embodiment of the present disclosure. FIG. 8B is a diagram illustrating a target right-eye image, according to an embodiment of the present disclosure.

Figure 9A:
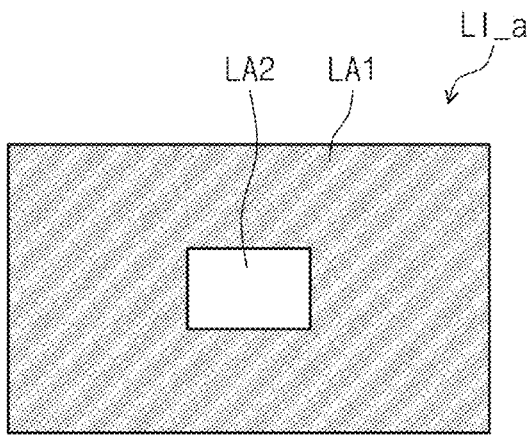
FIG. 9A is a diagram illustrating an actual left-eye input image, according to an embodiment of the present disclosure.
Figure 9B:
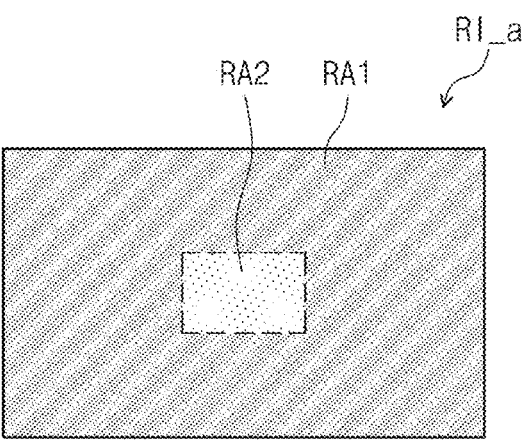
FIG. 9B is a diagram illustrating an actual right-eye input image, according to an embodiment of the present disclosure.

FIG. 9A is a diagram illustrating an actual left-eye image, according to an embodiment of the present disclosure. FIG. 9B is a diagram illustrating an actual right-eye image, according to an embodiment of the present disclosure.

Referring to FIGS. 8A and 8B, the 3D image may include a target left-eye image LI and a target right-eye image RI, where the target left-eye image LI and the target right-eye image RI may include different images. For example, the target left-eye image LI may include a first left-eye grayscale area LA1 having a first grayscale and a second left-eye grayscale area LA2 having a second grayscale. The target right-eye image RI may include a right-eye grayscale area RA having the first grayscale. As an example, the first grayscale may be a black grayscale, and the second grayscale may be a white grayscale.

However, when a 3D image is presented using the display device DD, some of the target left-eye images LI may be perceived by a user's right-eye, and some of the target right-eye images RI may be perceived by the user's left eye.

FIGS. 9A and 9B show an actual left-eye image LI_a perceived by the actual user's left-eye and an actual right-eye image RI_a perceived by the actual user's right eye. In the same way as the target left-eye image LI (see FIG. 8A), the actual left-eye image LI_a may include the first left-eye grayscale area LA1 having the first grayscale and the second left-eye grayscale area LA2 having the second grayscale. However, unlike the target right-eye image RI (see FIG. 8B), it may be recognized that the actual right-eye image RI_a includes two grayscale areas (e.g., a first right-eye grayscale area RA1 and a second right-eye grayscale area RA2) because some of the target left-eye image LI is provided to the user's right eye. The first right-eye grayscale area RA1 may have the first grayscale, but the second right-eye grayscale area RA2 may have a third grayscale higher than the first grayscale.

As an example, when the first grayscale is a black grayscale, the first left-eye grayscale area LA1 may have black luminance of 0 nits. When the second grayscale is a white grayscale, the second left-eye grayscale area LA2 may have white luminance of 100 nits. The first right-eye grayscale area RA1 may have a black luminance of 0 nits in the actual right-eye image RI_a; however, the second right-eye grayscale area RA2 may have a distortion black luminance higher than the black luminance. For example, the distortion black luminance may have the luminance of 1 nit to 3 nits, which is higher than the 0 nits of the first left-eye grayscale area LA1.

Figure 10:
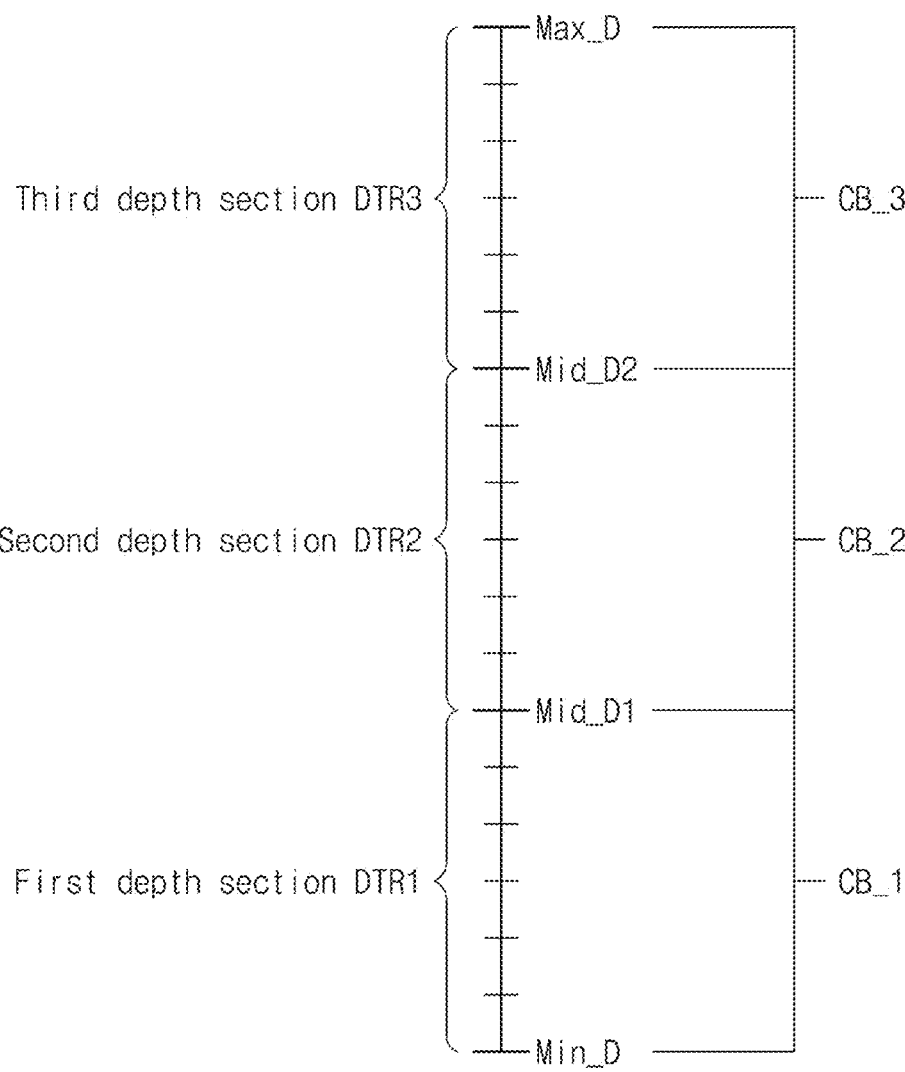
FIG. 10 is a diagram illustrating a correction black luminance according to a depth of a 3D image, according to an embodiment of the present disclosure.

FIG. 10 is a diagram illustrating correction black luminance, according to a depth of a 3D image, according to an embodiment of the present disclosure.

Referring to FIGS. 7 and 10, a 3D image may have a depth between a predetermined minimum depth Min_D and a predetermined maximum depth Max_D. The depth of the 3D image may be a value selected by a user, or may be a value appropriately selected based on image information displayed by the electronic device ED (see FIG. 6). The depth between the minimum depth Min_D and the maximum depth Max_D may be subdivided into depth sections.

In various embodiments, the driving controller 100 may classify depth sections of the 3D image set between the minimum depth Min_D and the maximum depth Max_D into three sections (hereinafter referred to as a "first depth section DTR1", a "second depth section DTR2", and a "third depth section DTR3"). The first depth section DTR1 may be a section from the minimum depth Min_D to a first middle depth Mid_D1, the second depth section DTR2 may be a section from the first middle depth Mid_D1 to a second middle depth Mid_D2, and the third depth section DTR3 may be a section from the second middle depth Mid_D2 to the maximum depth Max_D. The driving controller 100 may also classify depth sections of the 3D image set between the minimum depth Min_D and the maximum depth Max_D into more or fewer depth sections.

In various embodiments, each of the first to third depth sections DTR1, DTR2, and DTR3 may include at least one depth. The driving controller 100 may determine a depth section, to which the depth of the 3D image belongs, from among the first to third depth section DTR1, DTR2, and DTR3, and may compensate for black luminance of a black grayscale depending on the corresponding depth section. The black luminance may be a reference black luminance that the 2D image has in a black grayscale. For example, when the depth of the 3D image belongs to the first depth section DTR1, the driving controller 100 may compensate for the reference black luminance of a black grayscale by calculating a first correction black luminance CB_1. When the depth of the 3D image belongs to the second depth section DTR2, the driving controller 100 may compensate for the reference black luminance of a black grayscale by calculating a second correction black luminance CB_2. When the depth of the 3D image belongs to the third depth section DTR3, the driving controller 100 may compensate for the reference black luminance of a black grayscale by calculating a third correction black luminance CB_3.

In various embodiments, the second correction black luminance CB_2 may be higher than the first correction black luminance CB_1. The third correction black luminance CB_3 may be higher than the second correction black luminance CB_2. Therefore, as the depth of the 3D image increases, the correction black luminance in a black grayscale may also increase.

FIG. 10 illustrates the three depth sections DTR1, DTR2, and DTR3, but the number of depth sections is not limited thereto. For example, when the depth section is further divided, the reference black luminance of the black grayscale may also be more finely corrected, where additional correction black luminances may be calculated.

Figure 11A:
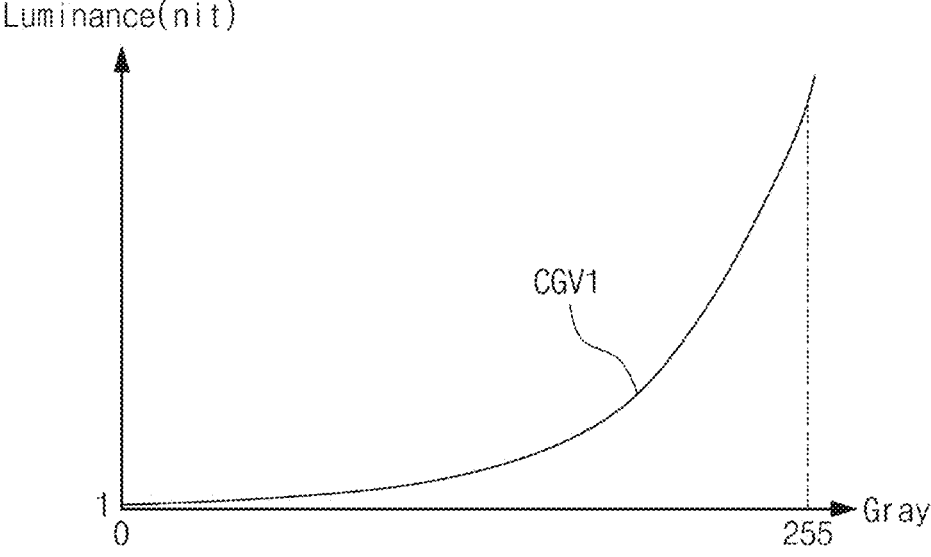
FIG. 11A is a graph illustrating a first correction black luminance obtained by compensating luminance for each grayscale by using a first correction reference gamma value, according to an embodiment of the present disclosure.

FIG. 11A is a graph CGV1 illustrating the first correction black luminance CB_1 obtained by compensating luminance for each grayscale by using a first correction reference gamma value, according to an embodiment of the present disclosure.

Figure 11B:
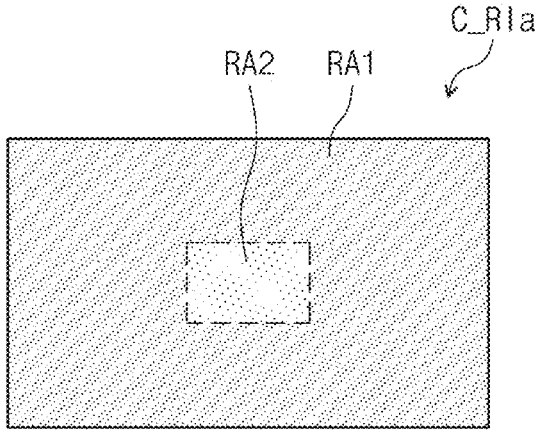
FIG. 11B is a diagram showing a first correction right-eye image when the first correction black luminance of FIG. 11A is applied.

FIG. 11B is a diagram showing a first correction right-eye image C_R1a when the first correction black luminance CB_1 of FIG. 11A is applied.

Referring to FIGS. 7, 10, 11A, and 11B, when the depth of a 3D image belongs to the first depth section DTR1, the driving controller 100 may compensate for the black luminance of a black grayscale (i.e., grayscale 0) to the first correction black luminance CB_1. However, the embodiment is not limited thereto, and each of the plurality of correction gamma tables included in the memory 130 (see FIG. 7) may store correction black luminance corresponding to a depth section selected from among a plurality of depth sections. For example, each of the plurality of correction gamma tables may store a first correction black luminance CB_1 corresponding to a first depth section DTR1. For example, when the black luminance is 0 nits, the first correction black luminance CB_1 may be 1 nit. The gamma selection unit 120 may select a correction gamma value having a black grayscale luminance of 1 nit from among the correction gamma values, as a correction reference gamma value, and may provide correction gamma data corresponding to the correction reference gamma value to the data conversion unit 110. The driving controller 100 may be configured to receive an image signal, convert the image signal into 2D image data 2D_DATA based on a reference gamma value, and convert the image signal into 3D image data 3D_DATA based on a correction reference gamma value different from the reference gamma value.

In various embodiments, as the black grayscale in a first right-eye grayscale area RA1 is expressed at the first correction black luminance CB_1 of 1 nit, a luminance difference between first and second right-eye grayscale areas RA1 and RA2 may be reduced, where the luminance difference may be reduced by adjusting the luminance in a black grayscale depending on the depth of a 3D image in a 3D image display mode. Accordingly, even when some of the target left-eye image LI (see FIG. 8A) is provided to a user's right-eye, crosstalk occurring in the 3D image may be reduced.

Figure 12A:
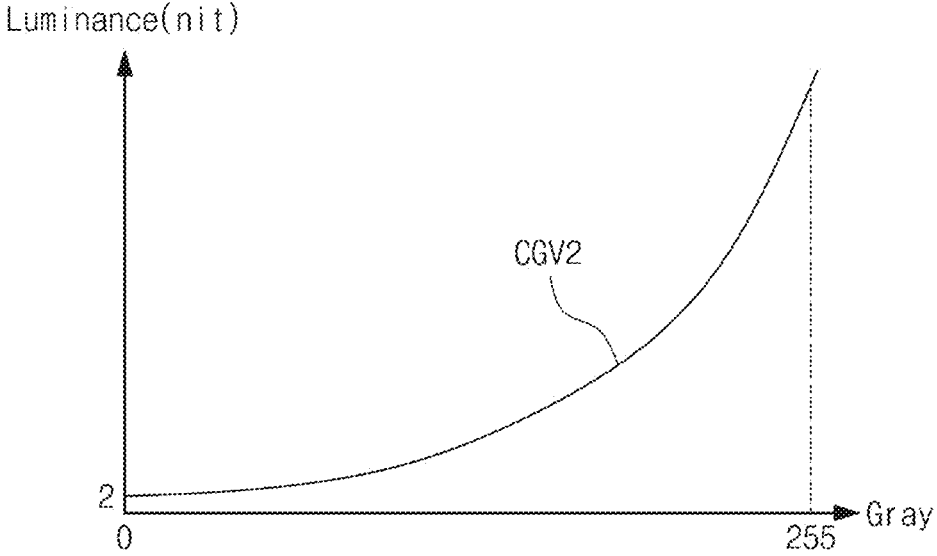
FIG. 12A is a graph illustrating a second correction black luminance obtained by compensating luminance for each grayscale by using a second correction reference gamma value, according to an embodiment of the present disclosure.

FIG. 12A is a graph CGV2 illustrating the second correction black luminance CB_2 obtained by compensating luminance for each grayscale by using a second correction reference gamma value, according to an embodiment of the present disclosure.

Figure 12B:
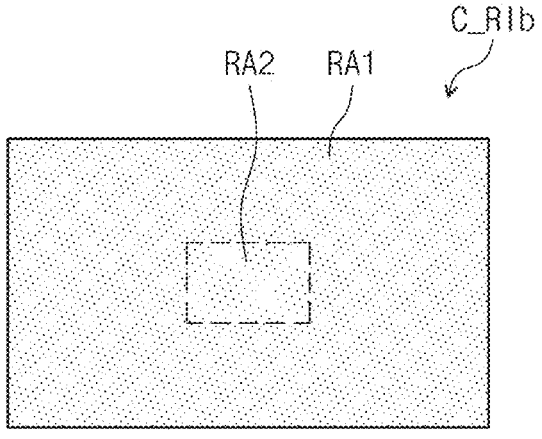
FIG. 12B is a diagram showing a second correction right-eye image when the second correction black luminance of FIG. 12A is applied.

FIG. 12B is a diagram showing a second correction right-eye image C_RIb when the second correction black luminance CB_2 of FIG. 12A is applied.

Referring to FIGS. 7, 10, 12A, and 12B, when the depth of a 3D image belongs to the second depth section DTR2, the driving controller 100 may compensate for the black luminance of a black grayscale (i.e., grayscale 0) by calculating the second correction black luminance CB_2. For example, when the black luminance is 0 nits, the second correction black luminance CB_2 may be 2 nits. The gamma selection unit 120 may select a correction gamma value having the black grayscale luminance of 2 nits from among the correction gamma values as a correction reference gamma value, and may provide correction gamma data corresponding to the correction reference gamma value to the data conversion unit 110.

As the black grayscale in the first right-eye grayscale area RA1 is expressed at the second correction black luminance CB_2 of 2 nits, a luminance difference between the first and second right-eye grayscale areas RA1 and RA2 may be further reduced, where the luminance difference may be reduced by adjusting the luminance in a black grayscale depending on the depth of a 3D image in a 3D image display mode. Accordingly, even when some of the target left-eye image LI (see FIG. 8A) is provided to a user's right-eye, crosstalk occurring in the 3D image may be further reduced.

Figure 13A:
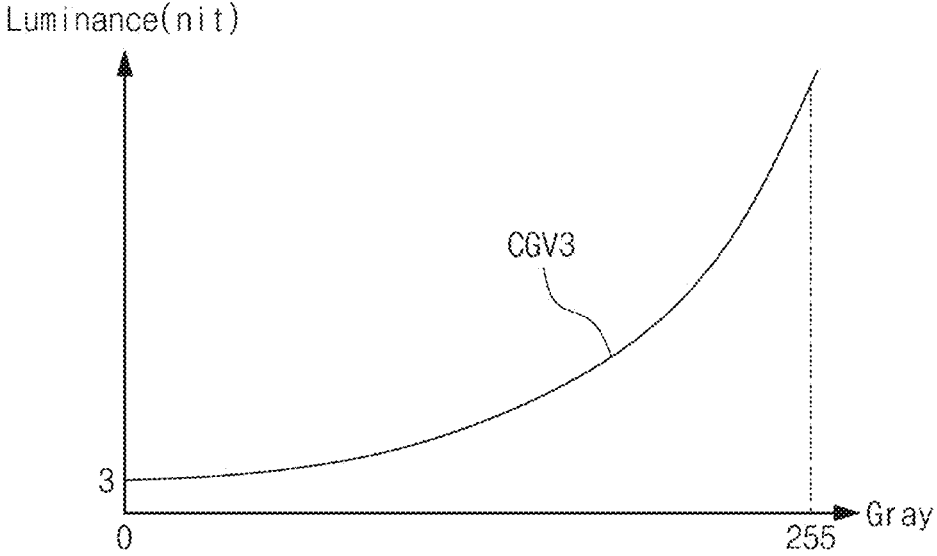
FIG. 13A is a graph illustrating a third correction black luminance obtained by compensating luminance for each grayscale by using a third correction reference gamma value, according to an embodiment of the present disclosure.

FIG. 13A is a graph CGV3 illustrating the third correction black luminance CB_3 obtained by compensating luminance for each grayscale by using a third correction reference gamma value, according to an embodiment of the present disclosure.

Figure 13B:
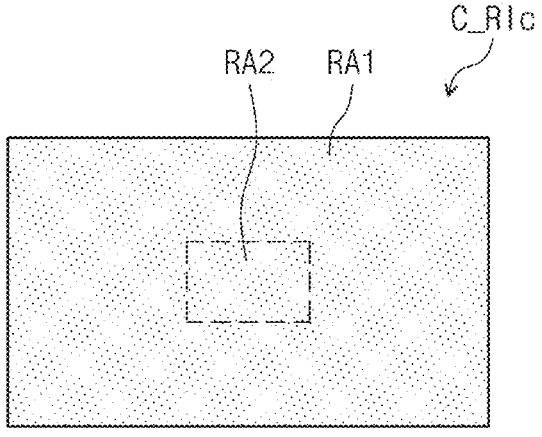
FIG. 13B is a diagram showing a third correction right-eye image when the third correction black luminance of FIG. 13A is applied.

FIG. 13B is a diagram showing a third correction right-eye image C_RIc when the third correction black luminance CB_3 of FIG. 13A is applied.

Referring to FIGS. 7, 13A, and 13B, when the depth of a 3D image belongs to the third depth section DTR3, the driving controller 100 may compensate for the black luminance of a black grayscale (i.e., grayscale 0) by calculating the third correction black luminance CB_3. For example, when the black luminance is 0 nits, the third correction black luminance CB_3 may be 3 nits. The gamma selection unit 120 may select a correction gamma value having the black grayscale luminance of 3 nits from among the correction gamma values, as a correction reference gamma value, and may provide correction gamma data corresponding to the correction reference gamma value to the data conversion unit 110.

As the black grayscale in the first right-eye grayscale area RA1 is expressed at the third correction black luminance CB_3 of 3 nits, a luminance difference between the first and second right-eye grayscale areas RA1 and RA2 may be reduced. Accordingly, even when some of the target left-eye image LI (see FIG. 8A) is provided to a user's right-eye, when the 3D image is displayed, crosstalk may be prevented from occurring. The gamma selection unit 120 may determine a depth section, to which a depth of the 3D image belongs, from among the plurality of depth sections based on the depth information D_I, and selects one correction gamma value from among the plurality of correction gamma values, such that the 3D image has a correction black luminance CB_1, CB_2, CB_3, set to correspond to a corresponding depth section DTR_1, DTR_2, DTR_3, in a black grayscale.

Figure 14A:
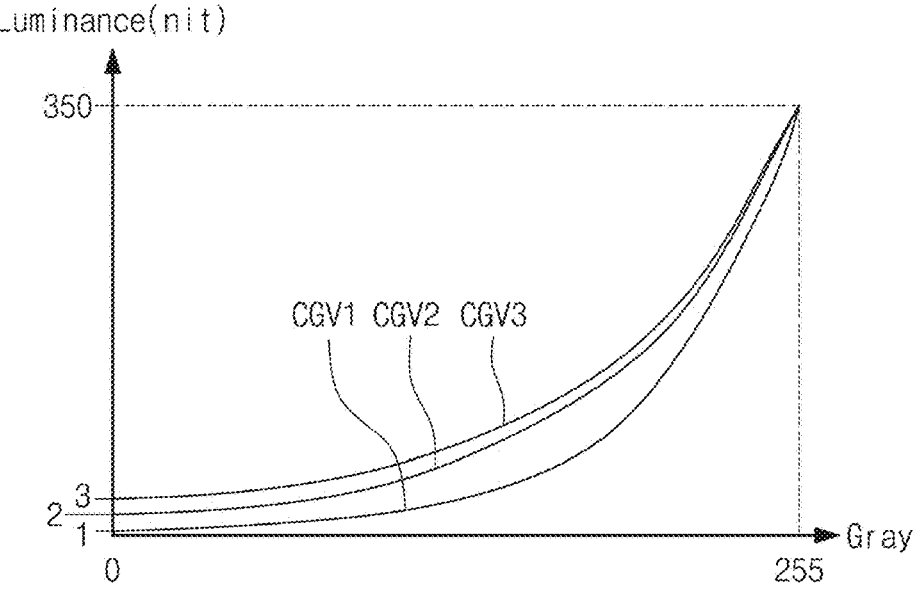
FIG. 14A is graphs illustrating luminance for each grayscale according to the first to third correction reference gamma values shown in FIGS. 11A, 12A, and 13A.
Figure 14B:
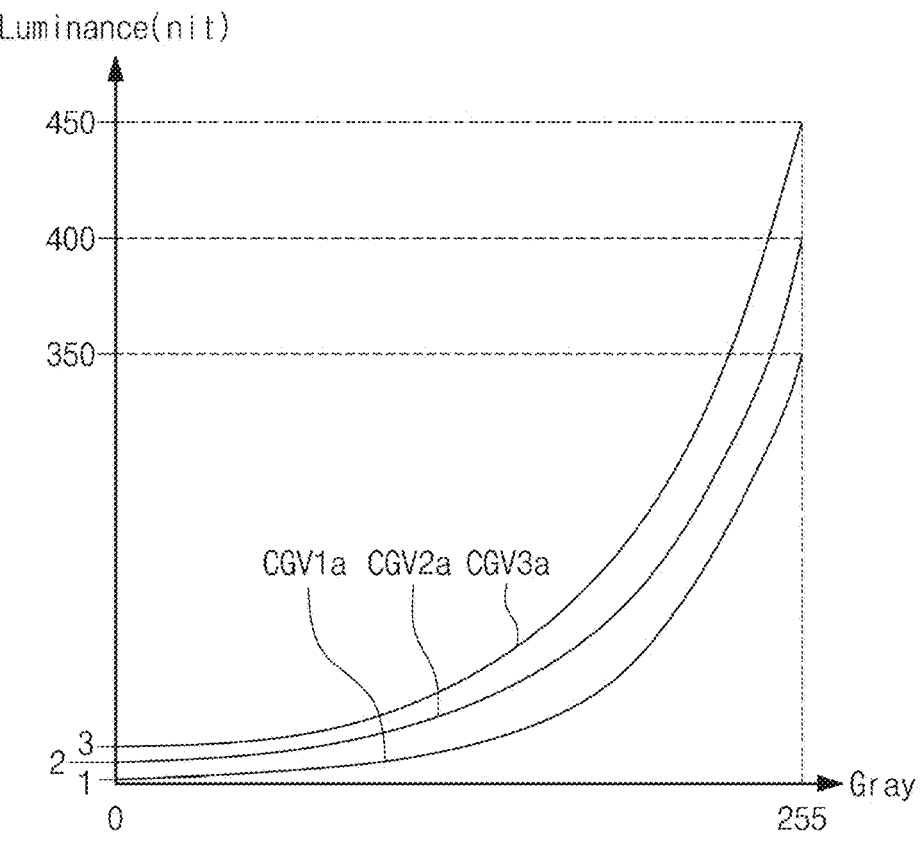
FIG. 14B shows graphs obtained by correcting luminance of a white grayscale in a 3D image, according to an embodiment of the present disclosure.

FIG. 14A is graphs CGV1, CGV2, and CGV3 illustrating luminance for each grayscale, according to the first to third correction reference gamma values shown in FIGS. 11A, 12A, and 13A. FIG. 14B shows graphs CGV1a, CGV2a, and CGV3a obtained by correcting luminance of a white grayscale in a 3D image, according to an embodiment of the present disclosure.

Referring to FIG. 14A, the driving controller 100 (see FIG. 7) may correct reference black luminance of a black grayscale to first to third correction black luminance by applying first to third correction reference gamma values, respectively. The white luminance in a white grayscale (e.g., grayscale 255) may be fixed without correction. In other words, the white luminance may be fixed to reference white luminance (e.g., 350 nits) that the 2D image has in the white grayscale.

In various embodiments, the driving controller 100 may correct the reference white luminance of the white grayscale, while correcting the reference black luminance of the black grayscale to the first to third correction black luminance CB_1, CB_2, and CB_3 (see FIG. 10). The gamma selection unit 120 (see FIG. 7) may set the correction reference gamma value such that the 3D image has predetermined correction white luminance in the white grayscale.

Referring to FIG. 14B, when the 3D image has lower luminance in the white grayscale than the 2D image, the reference white luminance in the white grayscale may be corrected to compensate for the decrease in luminance in the 3D image. For example, the driving controller 100 may correct the reference white luminance to the first or second correction white luminance (e.g., 400 nits or 450 nits) higher than the reference white luminance. Accordingly, a reduced luminance when the 3D image is displayed may be improved.

According to an embodiment of the present disclosure, crosstalk may be reduced or prevented by adjusting the luminance in a black grayscale depending on the depth of a 3D image in a 3D image display mode even though some of a left-eye image is provided to a user's right-eye, or some of a right-eye image is provided to the user's left-eye. As a result, the display quality of the 3D image may be improved.

Although various embodiments of the present disclosure have been described for illustrative purposes, those skilled in the art will appreciate that various modifications, and substitutions are possible, without departing from the scope and spirit of the present disclosure as set forth in the accompanying claims. Accordingly, the technical scope of the present disclosure is not limited to the detailed description of this specification, but should be determined in reference to the claims.

What is claimed is:

1. A display device comprising:
a display panel including a plurality of pixels, wherein the display panel is configured to output a first image in a first mode and to output a second image in a second mode;
a switch lens array on the display panel and configured to output the first image as a two-dimensional (2D) image in the first mode and to convert the second image into a three-dimensional (3D) image in the second mode; and
a driving controller configured to convert an image signal into 2D image data based on a reference gamma value, and to convert the image signal into 3D image data based on a correction reference gamma value different from the reference gamma value,
wherein the driving controller includes a gamma selection unit configured to select one correction gamma value from among a plurality of correction gamma values, as the correction reference gamma value, the one correction gamma value is selected depending on predetermined depth information of the 3D image.

2. The display device of claim 1, wherein the driving controller further includes:
a memory including a plurality of correction gamma tables respectively corresponding to the plurality of correction gamma values, and
wherein each of the plurality of correction gamma tables includes correction gamma data for each grayscale.

3. The display device of claim 2, wherein each of the plurality of correction gamma tables stores correction black luminance corresponding to a depth section selected from among a plurality of depth sections, and
wherein the gamma selection unit determines a depth section, to which a depth of the 3D image belongs, from among the plurality of depth sections based on the depth information, and selects one correction gamma value from among the plurality of correction gamma values, such that the 3D image has a correction black luminance set to correspond to a corresponding depth section in a black grayscale.

4. The display device of claim 3, wherein the gamma selection unit selects the correction reference gamma value, such that the correction black luminance in the black grayscale increases as the depth of the 3D image increases.

5. The display device of claim 3, wherein the correction black luminance is higher than a reference black luminance that the 2D image has in the black grayscale.

6. The display device of claim 1, wherein the gamma selection unit sets the correction reference gamma value, such that the 3D image has a predetermined correction white luminance in a white grayscale.

7. The display device of claim 6, wherein the correction white luminance is higher than a reference white luminance that the 2D image has in the white grayscale.

8. The display device of claim 1, wherein the driving controller further includes:
a data conversion unit configured to convert the image signal into the 2D image data based on the reference gamma value in the first mode, and to convert the image signal into the 3D image data based on the correction reference gamma value in the second mode.

9. The display device of claim 1, wherein the switch lens array is turned off in the first mode, and is turned on in the second mode to form a plurality of lenses.

10. The display device of claim 9, wherein each of the plurality of lenses corresponds to 'k' pixels among the plurality of pixels, the 'k' being a natural number greater than 1, and
wherein some of the 'k' pixels output a left-eye image, and the others of the 'k' pixels output a right-eye image.

11. An electronic device comprising:
a display panel including a plurality of pixels, wherein the display panel is configured to output a first image in a first mode and to output a second image in a second mode;
a switch lens array on the display panel and configured to output the first image as a 2D image in the first mode and to convert the second image into a 3D image in the second mode;
a driving controller configured to receive an image signal, to convert the image signal into 2D image data based on a reference gamma value, and to convert the image signal into 3D image data based on a correction reference gamma value different from the reference gamma value; and
a main processor configured to provide the image signal to the driving controller,
wherein the driving controller includes a gamma selection unit configured to select one correction gamma value from among a plurality of correction gamma values, as the correction reference gamma value, the one correction gamma value is selected depending on predetermined depth information of the 3D image.

12. The electronic device of claim 11, wherein the driving controller further includes:
a memory including a plurality of correction gamma tables respectively corresponding to the plurality of correction gamma values, and
wherein each of the plurality of correction gamma tables includes correction gamma data for each grayscale.

13. The electronic device of claim 12, wherein each of the plurality of correction gamma tables stores correction black luminance corresponding to a depth section selected from among a plurality of depth sections, and
wherein the gamma selection unit determines a depth section, to which a depth of the 3D image belongs, from among the plurality of depth sections based on the depth information, and selects one correction gamma value from among the plurality of correction gamma values, such that the 3D image has a correction black luminance set to correspond to a corresponding depth section in a black grayscale.

14. The electronic device of claim 13, wherein the gamma selection unit selects the correction reference gamma value, such that the correction black luminance in the black grayscale increases as the depth of the 3D image increases.

15. The electronic device of claim 13, wherein the correction black luminance is higher than a reference black luminance that the 2D image has in the black grayscale.

16. The electronic device of claim 11, wherein the gamma selection unit sets the correction reference gamma value, such that the 3D image has a predetermined correction white luminance in a white grayscale.

17. The electronic device of claim 16, wherein the correction white luminance is higher than a reference white luminance that the 2D image has in the white grayscale.

18. The electronic device of claim 11, wherein the driving controller further includes:

a data conversion unit configured to convert the image signal into the 2D image data based on the reference gamma value in the first mode and to convert the image signal into the 3D image data based on the correction reference gamma value in the second mode.

19. The electronic device of claim 11, wherein the switch lens array is turned off in the first mode, and is turned on in the second mode to form a plurality of lenses.

20. The electronic device of claim 19, wherein each of the plurality of lenses corresponds to 'k' pixels among the plurality of pixels, the 'k' being a natural number greater than 1, and wherein some of the 'k' pixels output a left-eye image, and the others of the 'k' pixels output a right-eye image.

\* \* \* \* \*